United States Patent Office 3,210,163
Patented Oct. 5, 1965

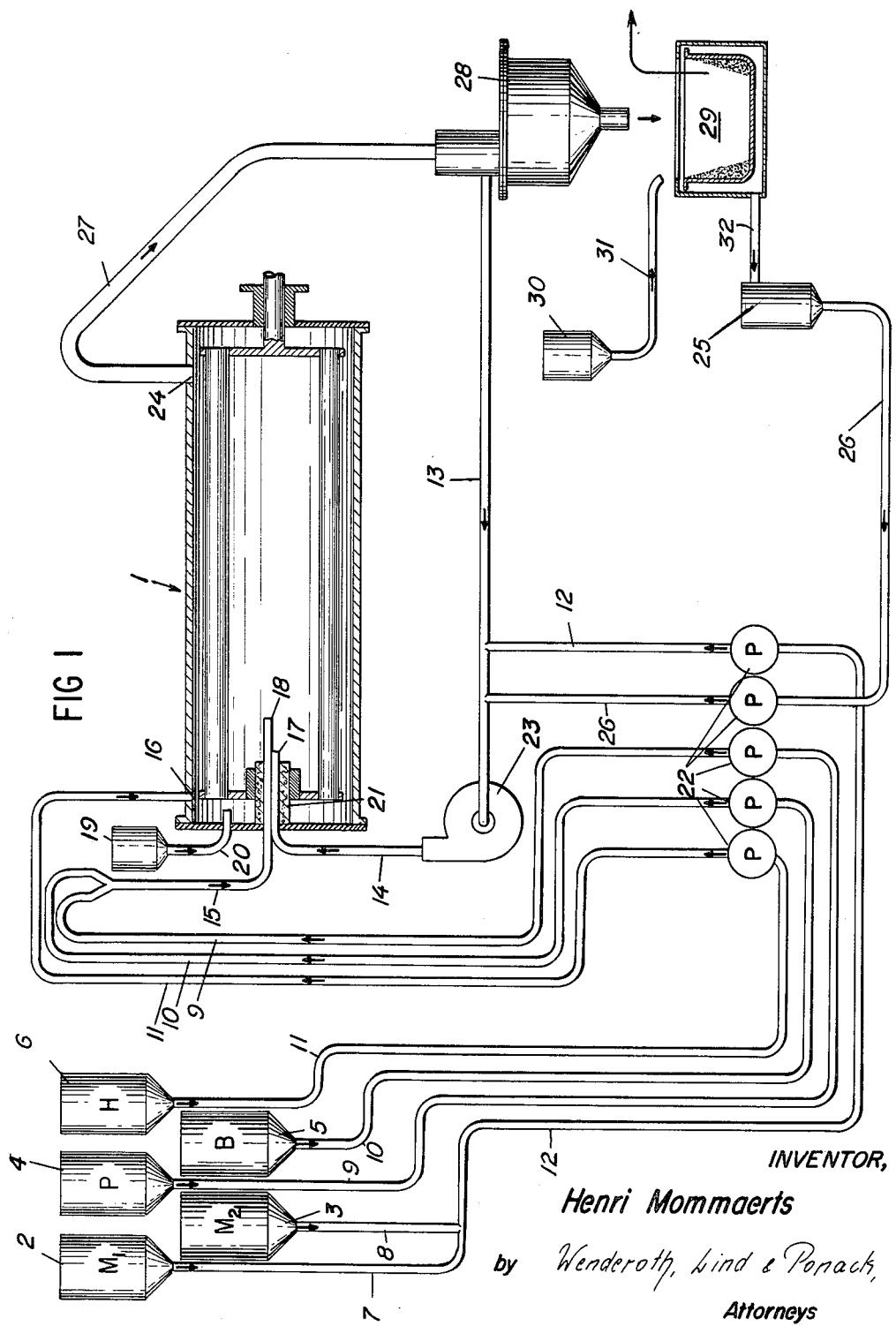

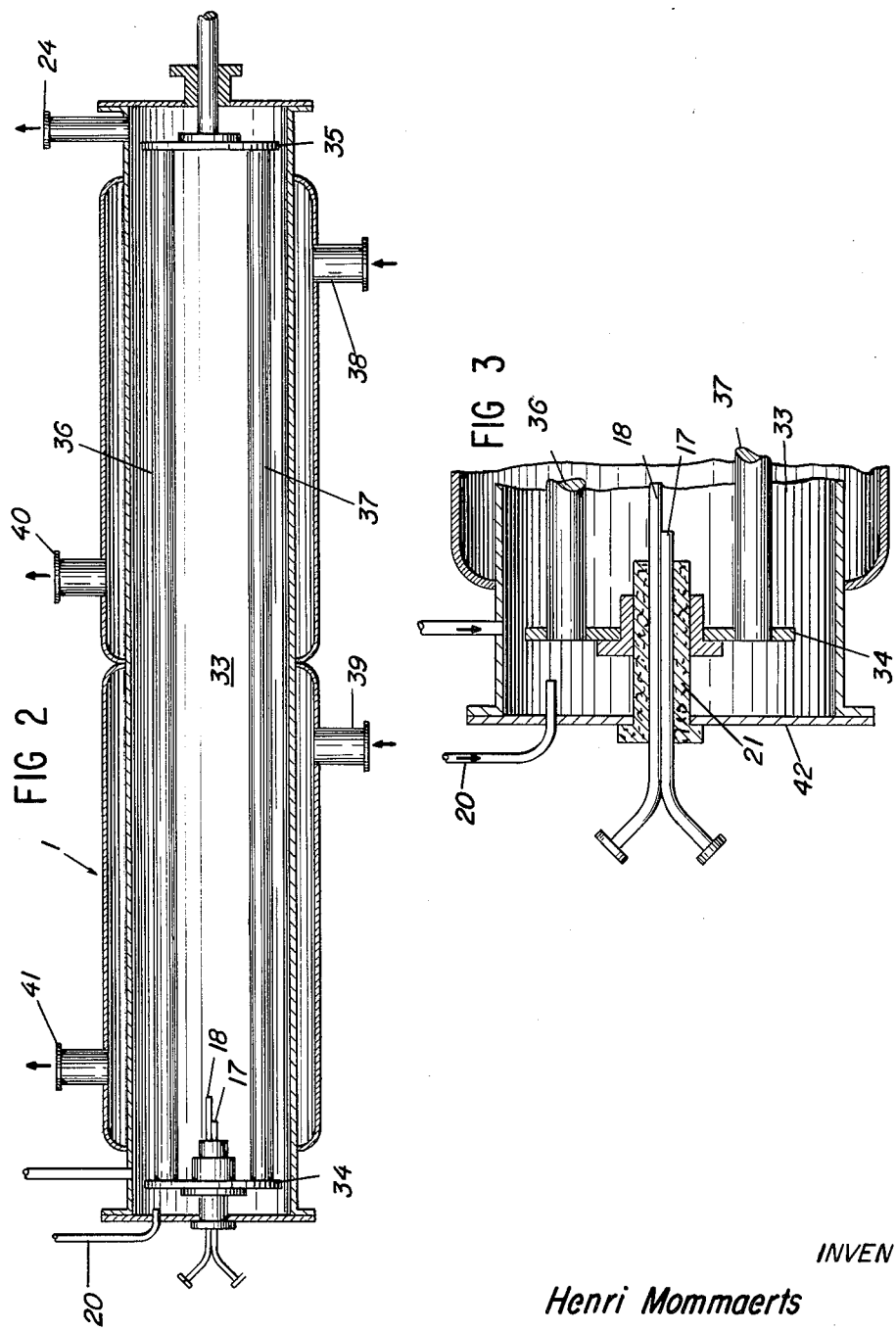

3,210,163
APPARATUS FOR THE CONTINUOUS POLYMERIZATION OF VINYL MONOMERS
Henri Mommaerts, Ixelle-Brussels, Belgium, assignor to UCB (Union Chimique-Chemische Bedrijven) S.A., Brussels, Belgium, a corporation of Belgium
Filed Mar. 21, 1962, Ser. No. 181,382
Claims priority, application Netherlands, Mar. 22, 1961, 262,676
1 Claim. (Cl. 23—285)

The present invention relates to an apparatus for the continuous polymerization of vinyl monomers.

By vinyl monomers is meant for instance customary vinyl derivatives such as vinyl chloride, vinyl acetate, and other derivatives, acrylic derivatives, such as acrylonitrile, acrylic and methacrylic esters, acrylic and methacrylic acids, and the like, and also any other vinyl or vinylidene derivative.

By polymerization is meant any polyaddition reaction of one or more monomers.

It is known to polymerize vinyl monomers in vertical tanks in the presence of a gaseous phase.

It is also known to use polymerization vessels of the inverted retort or calumet type.

These various processes all have the disadvantage of working in the presence of a gaseous phase generally in the presence of an inert gas or of air and of accumulations of polymers formed in the upper parts.

The presence of a gaseous phase is always liable to cause degradation or alteration of the starting materials and of the products obtained.

The accumulation of the polymer or of the copolymer formed induces incrustations on the upper walls, i.e. the formation of adhering deposits of solid particles of the polymers or copolymers formed.

This entails the necessity of frequently cleaning the polymerization tanks. In practice, all these systems lead to non-continuous or semi-continuous polymerization.

Even if continuous polymerization were considered, the frequency of cleaning of the polymerization tanks which would be necessary to eliminate the caking or hard deposits accumulating on the walls would result in continuous working in name only.

In addition, polymerization in an aqueous solution of one or more vinyl monomers and more particularly of acrylonitrile, which is selected as an example, or of a mixture of monomers containing the latter, necessitates the use of large volumes of water because of the low solubility coefficient of the monomer or monomers.

The present invention overcomes these drawbacks by permitting continuous polymerization in the absence of a gaseous atmosphere and with a reduced amount of water, without any disturbing incrustations forming on the walls of the reaction tank.

The method according to the invention comprises feeding the reagents, on the one hand, a supersaturated solution of the monomer or monomers, maintained at about room temperature, and on the other hand the catalyst solution, continuously through separate tubes at the center of one of the end plates of a horizontal cylindrical tank entirely filled with liquid and provided with an agitator, the lengths of penetration into the tank of said feeding tubes being different.

The apparatus allowing the application of the process of the invention comprises a reactor of the horizontal type having an inlet for the reagents situated in the axis of the cylinder and formed by at least two entry tubes the apertures of which are staggered in relation to one another, an outlet for the polymerized mass, an agitation drum formed by at least two discs connected together, means of irrigation of the inside entry end plate of the reactor and of the adjacent disc and of the bearing of the agitation drum, an apparatus of known type for the scalding of the polymerized mass for the purpose of recovery and recycling to the reactor of the unreacted monomers, a continuous centrifuge for the separation of the polymer or copolymer and a means of recycling the mother liquors into the polymerization reactor.

The horizontal reactor is double-walled in order to allow conditioning of the reaction products, if required.

The apparatus claimed permits carrying out a perfect polymerization cycle, scalding, and centrifuging of the polymer with recovery of the monomer.

Polymerization in a horizontal reactor, in a solely liquid phase, presents the advantage of preventing accumulations of the polymer products at the upper part, thus preventing incrustations which are detrimental to heat exchange. In addition, the horizontal cylindrical form confers more advantageous distribution of the volume.

The bars connecting the support discs of the agitation drum may be hollow or solid.

The irrigation of the internal entry end plate of the reactor and of the adjacent disc and of the agitation drum bearing placed inside the reactor prevents the formation of deposits on the metal parts by forming a dilution zone.

The disposition of the inlet tubes for the introduction of the reagents plays an important part from the point of view of deposition.

The tubes are joined side by side and their apertures are staggered.

This special arrangement makes it possible to avoid the obstruction of the tubes owing to hard deposits formed by the polymerization products.

The materials used for the construction of the polymerization reactor are selected according to their characteristics of chemical and mechanical resistance. The apparatus may be made of stainless steel, nickel, aluminum, or any metal vitrified or lined with plastic materials, or even of plastic materials.

The introduction of a supersaturated solution of monomers into the reactor at a sufficiently low temperature makes conditioning of the horizontal reactor unnecessary. For example, the monomer suspension is introduced at room temperature in order to maintain a constant temperature of 50° C. in the reactor.

The accompanying figures, given by way of example and without having any limitative character, makes clearer the method and the apparatus according to the invention.

FIGURE 1 shows diagrammatically the sequence of apparatus allowing continuous polymerization.

FIGURE 2 shows in greater detail the polymerization reactor of the type claimed.

FIGURE 3 shows a detailed view of the irrigation of the inside entry end plate of the reactor and of the adjacent disc and of the agitation drum bearing.

According to FIGURE 1, the monomers $M_1$, $M_2$ coming from the storage tanks 2 and 3 are supplied to the polymerization reactor through the pipes 7, 8, 12, 13, and 14, the catalytic system formed of the compounds P and B stored in the tanks 4 and 5 are supplied through the pipes 9, 10, and 15, and any other compounds, designated by H, capable of modifying the course of reaction and stored in the tank 6 are supplied through the pipes 11 and 16.

A pump 22 of any type, for example of the piston type, delivers into the reactor accurately measured quantities of the various polymerization reagents, and the emulsification pump 23, of known type, emulsifies the monomers $M_1$, $M_2$, the mother liquors stored stored in 25 and supplied through the pipe 26, and the monomers recovered from the scalding and supplied through the pipe 13.

The monomers $M_1$, $M_2$ are introduced into the reactor 1 through an inlet tube 17 and the catalytic system through the inlet tube 18 joined thereto and staggered in relation to the first-mentioned tube 17.

The water for irrigating the packing of the agitation drum is stored at 19 and supplied into the reactor just above the packing 21 through the pipe 20.

The polymerization products which completely fill the reactor are continuously discharged through the outlet 24 and the pipe 27 and subjected to scalding in the apparatus 28 in order to recover the unreacted monomers, which are recycled into the reactor through the pipe 13.

The scalded mass is continuously centrifuged in a centrifuge 29 of known type. The mother liquors with the first washing waters, coming from a tank 30 and supplied to the centrifuge through the pipe 31, are discharged through the pipe 32, stored in 25, and recycled through the pipe 26.

FIGURE 2 illustrates in greater detail the polymerization reactor 1 of the horizontal type.

The reactor 1 comprises an inlet for the reagents which is situated in the axis of the cylinder and formed by two inlet tubes 17 and 18, the apertures of which are staggered in relation to one another, an outlet 24 for the polymerized mass, an agitation drum 33 formed by two discs 34 and 35 connected together by two bars 36, 37.

The polymerization reactor 1 is double-walled in order to permit its conditioning by conditioning liquids supplied through the entries 38, 39 and are discharged through the outlets 40 and 41.

The irrigation system illustrated in detail in FIGURE 3 comprises a pipe 20 supplying the water just above the packing 21 of the agitation drum 33 and at a point situated between the entry end plate of the reactor 42 and the adjacent disc 34 of the agitation drum.

This arrangement permits the irrigation of the packing 21, of the end plate 42, and of the disc 34.

The following non-limitative example relates to the polymerization of a mixture of acrylonitrile monomers and methyl methacrylate.

A suspension of 31 kg. per hour of acrylonitrile and methyl methacrylate is introduced into one of the inlet tubes of the polymerization reactor, said suspension being formed by 25.5 kg. per hour of fresh monomer and 5.5 kg. per hour of monomers recovered from the scalding, in 168 liters of $H_2O$ per hour.

The catalytic system, for example a redox system, obtained by mixing 134 g. per hour of $(NH_4)_2S_2O_8$ in 5 liters of $H_2O$ per hour and 107 g. per hour of $NaHSO_3$ in 5 liters of $H_2O$ per hour, is introduced into the second tube which for example, discharges 15 cm. beyond the entry aperture for the monomers.

Acid may be added to the reactor near the admission of the reagents, in order to obtain the desired pH. $H_2SO_4$ may be added to the redox system or to the solution of monomers just before introduction into the polymerization reactor, or be introduced into the latter through a pipe situated at any point at the entry to the reactor.

Other substances able to modify the course of the polymerization may be added through an additional pipe, either joined to the other two pipes, or discharging at any point into the reactor. For example, acid is added in the form of a mixture containing 5 g. per hour of sulfuric acid, 1.31 g. per hour of Mohr's salt and 1.02 liters per hour of water.

In order to avoid incrustations on the internal entry end plate of the reactor and on the disc and bearing of the agitation drum situated inside the reactor, this section is irrigated by introducing 9 liters of water per hour.

The mean time during which the reagents remain in the apparatus is of the order of 2 hours.

The agitation drum has support discs connected by three hollow tubes and rotating at 65 r.p.m.

The agitation must be selected to have an intensity such that subsequent filtration of the suspension is facilitated.

At the outlet of the polymerization reactor, the polymer suspension is subjected to scalding, which permits recovery of the unreacted monomers and to obtain a given degree of desorption of the polymer.

Scalding is preferably carried out at a temperature and during a period of time such that the suspension leaving the apparatus will have the following composition:

| | Percent |
|---|---|
| Water | 88.4 |
| Polymer | 11.6 |
| Monomeric acrylonitrile | 0.25 |
| Salinity | 0.8 |

The polymer is centrifuged and the mother liquors together with the first washing liquids of the polymer are returned to the polymerization cycle.

I claim:

An apparatus for effecting the continuous polymerization of a supersaturated aqueous solution of vinyl monomers, which comprises:

(a) a horizontal cylindrical reactor provided with (1) an inlet for the reagents which inlet is situated axially at one end of said reactor and is composed of two juxtaposed inlet tubes for monomer and catalyst medium respectively the lengths of penetration into the reactor of said inlet tubes being different, (2) an outlet located in the upper part of the opposite end of said reactor for withdrawal of the polymer suspension formed during the polymerization reaction, (3) an agitation drum axially mounted therein for producing vertical agitation and consisting of at least two rotatably mounted discs interconnected by at least two bars, said bars extending substantially through said reactor, said juxtaposed inlet tubes projecting axially through the disc of said agitation drum located adjacent the inlet end of said reactor, (4) means for rotating said agitation drum, (5) means for irrigating, at the inlet end of said reactor, both the internal end face of said reactor and said adjacent disc of the agitation drum and the bearing therefor;

(b) means for recovering the unreacted monomers from the polymer suspension withdrawn from said reactor and for recycling said unreacted monomers to said reactor;

(c) means for separating and washing the polymers obtained from the polymer suspension;

(d) means for recycling to said reactor the mother liquor from the polymer suspension and the first washings from the polymers.

References Cited by the Examiner

UNITED STATES PATENTS

| | | | |
|---|---|---|---|
| 2,428,411 | 10/47 | Davis. | |
| 2,474,592 | 6/49 | Palmer. | |
| 2,847,405 | 8/58 | Mallison | 260—85.5 X |
| 3,027,243 | 3/62 | Stratford | 23—285 |
| 3,063,815 | 11/62 | Redniss | 23—285 |
| 3,066,015 | 11/62 | Palmquist | 23—285 |
| 3,067,181 | 12/62 | Kluiber | 260—85.5 |
| 3,068,212 | 12/62 | Jenkins | 260—85.5 |
| 3,091,518 | 5/63 | Kizer et al. | 23—285 |

MORRIS O. WOLK, *Primary Examiner.*

JOSEPH R. LIBERMAN, *Examiner.*